Nov. 26, 1968  G. H. PRUETT, SR  3,412,570

RADIATION SENSITIVE SYSTEM FOR DETECTING REFRIGERANT LEAKS

Filed May 24, 1965

INVENTOR.
George H. Pruett, Sr.
BY
George H. Baldwin
ATTORNEY

United States Patent Office 3,412,570
Patented Nov. 26, 1968

3,412,570
RADIATION SENSITIVE SYSTEM FOR DETECTING REFRIGERANT LEAKS
George H. Pruett, Sr., 3922 Boone Park Ave., Jacksonville, Fla. 32205
Filed May 24, 1965, Ser. No. 458,079
9 Claims. (Cl. 62—129)

ABSTRACT OF THE DISCLOSURE

A system for detecting leaks of refrigerant including a liquid refrigerant line having a light transmitting portion therethrough, and a light source on one side of such portion, and a photo responsive device oppositely aligned therewith on the other side of such portion. The device is reponsive to light received, and when a refrigerant leak occurs the device controls circuit means to indicate such leak and/or disable further operation of the refrigeration system.

---

This invention relates to a novel and improved leak detection system particularly for detecting leaks of the refrigerant in a refrigeration system.

A general object of the present invention is to provide an improved system for detecting refrigerant leaks in a refrigeration system.

A specific object is the provision of an improved system for detecting leaks of the refrigerant and for controlling the refrigeration system whereby damage to the refrigerating equipment is minimized.

A particular object of this invention is to provide a simple leak detection system for detecting refrigerant leaks which is inexpensive in cost and easily installed and maintained.

Figure 1:
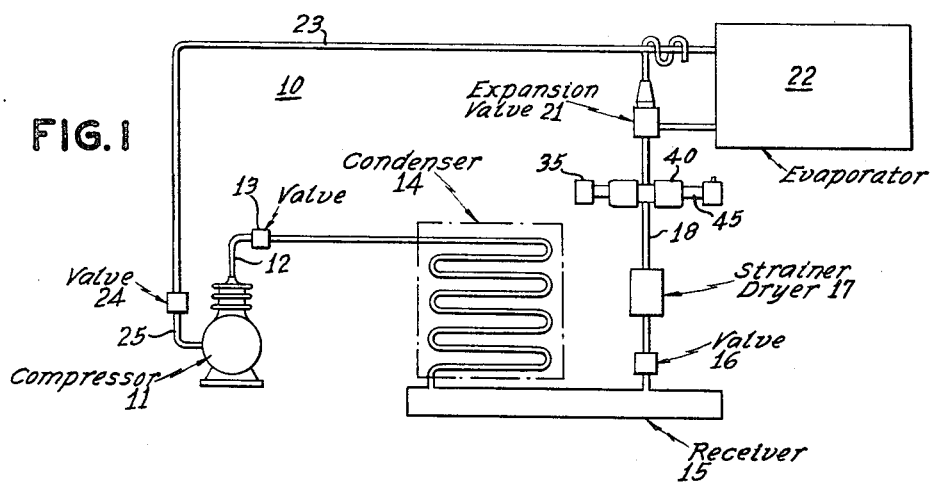
Figure 2:
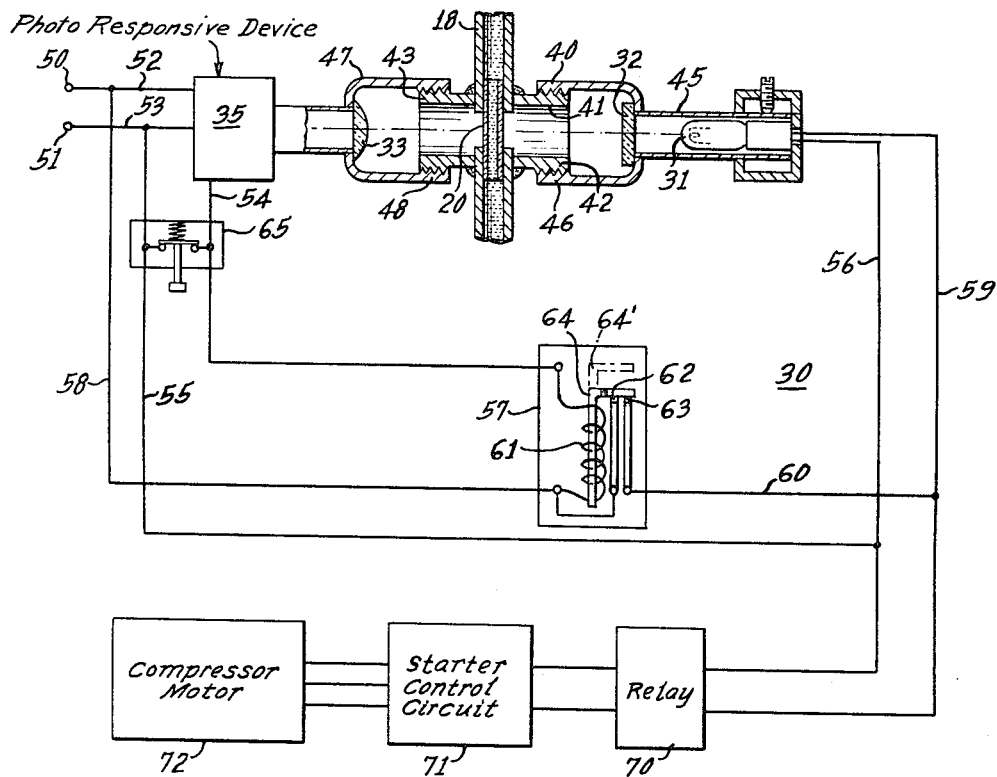

The novel features which are believed to be characteristic of this invention are set forth with particularity in the appended claims. The invention itself, however, both as to its organization and method of operation, together with further objects and advantages thereof, may be understood by reference to the following description taken in connection with the accompanying drawing, in which:

FIG. 1 is a diagrammatic view of the refrigeration system employing the leak detection system; and FIG. 2 is a refrigerant leak detection system in accordance with the invention.

Referring now more particularly to the drawing, FIG. 1 illustrates a common refrigeration system 10 comprising a compressor 11 which compresses the gaseous refrigerant and forces same into line 12 and through control valve 13. The compressed refrigerant passes through condenser 14, wherein the refrigerant is liquefied, and then into receiver 15. The warm liquid refrigerant flows from the receiver 15 through control valve 16 into the strainer dryer 17. The warm liquid refrigerant continues through liquid refrigerant line 18 and sight glass 20 (shown in FIG. 2) and then into the automatic expansion valve 21. From the expansion valve 21 the warm liquid refrigerant expands and passes into the evaporator 22 which evaporates the refrigerant and cools the air passing over the coils (not shown) within the evaporator 22. The gaseous refrigerant then passes through outlet line 23 and control valve 24 into the low or suction line 25, and then into compressor 11 to repeat the refrigeration cycle.

Referring now to FIG. 2, the leak detection system, in accordance with the present invention, is generally designated at 30, and comprises a light source 31, filter 32, lens 33, and a photo responsive device 35, more particularly described hereinafter. A suitable photo responsive device for use in the system disclosed herein is commerically available from the Progress Manufacturing Company, Inc. of Philadelphia 34, Pa., designated as P8752 Photo Electric Control.

Means in the form of a light transmitting housing or tube 20 is provided at a suitable location in the liquid refrigerant line 18 preferably between the strainer dryer 17 and automatic expansion valve 21. An elongated protective casing or pipe 20 extends laterally of line 18 on either side thereof, pipe 40 having an elongated passageway 41 therethrough. The housing 20 is disposed generally midway of the end portions 42 and 43 of pipe 40 and extends across passageway 41.

The light source 31 is positioned adjacent one side of liquid refrigerant housing 20 within a suitable coupler 45 which is connected by its inwardly threaded end portion 46 to outwardly threaded end portion 42 of casing 40. Light source 31 directs a beam of light through an appropriately selected filter 32 to obtain a low intensity beam and to permit proper installation and use of the leak detection system. The beam of light then passes within passageway 41 and through one side of housing 20, into the liquid refrigerant and out of the other side of housing 20. The light beam next passes outwardly from passageway 41 and through lens 33 positioned within a coupler 47 which is connected by its inwardly threaded end portion 48 to outwardly threaded end portion 43 of casing 40.

The voltage source (not shown) is connected to terminals 50 and 51 which are respectively connected by leads 52 and 53 to photo-responsive device 35. Device 35 is responsive to connect lead 53 to lead 54 when there is no light or when the light intensity received by device 35 is below a predetermined value. When device 35 receives a sufficiently intense light beam, which is above the predetermined amount, device 35 disconnects or decouples leads 53 and 54. Lead 53 is connected by line 55 and 56 to light source 31. Line 58 connects lead 52 to relay 57 and lead 54 connects device 35 to relay 57. Light source 31 is connected by lines 59 and 60 to relay 57. Between lines 54 and 55 is connected a normally closed manual restart switch 65.

After the voltage source is connected to terminals 50 and 51, the manual restart switch 65 is opened thus completing the circuit from lead 53 through normally closed photo responsive device 35 to lead 54, through the relay coil 61 of relay 57 to connect contacts 62 and 63 by armature 64 thereby connecting leads 58 and 60. The light source 31 is then activated by the completed circuit from leads 53, 55 and 56 through the light source 31 and back through leads 59, 60, 58 and 52 to the voltage source. When the light beam of sufficient intensity is received by photo responsive device 35, device 35 responds to disconnect leads 53 and 54 at which time the manual restart switch 65 may be released to assume its normally closed position. Thereafter, when the light beam decreases in intensity below the predetermined set value, as for example, when a leak occurs in the refrigerant line 18 of system 10 and the refrigerant clouds up due to the pressence of air bubbles in the liquid refrigerant, photo responsive device 35 connects leads 53 and 54 thereby shorting out relay 57 through switch 65 and causing armature 64 to assume an open position 64' which disconnects contacts 64 and 63. With relay 57 open, as shown by broken lines 64' in FIG. 2, light source 31 is extinguished and relay 70 is de-energized, relay 70 being in circuit with the starter control circuit 71 which in turn controls the compressor motor 72.

It is to be understood that the circuit specifically disclosed in FIG. 2 includes a means for indicating a refrigerant leak by locking out the refrigeration equipment when a leak occurs in the refrigerant line system. Such means might, if desired, also include or alternatively comprise a warning signal in the form of a bell or the like to provide a positive audio and/or visual indication that a leak has occurred in the refrigerant line system. One of the advantages of employing the lock out system as shown in FIG. 2 is to minimize damage to the equipment often caused by the equipment continuing to function after the refrigerant has escaped.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A leak detection system for detecting leaks of refrigerant in a refrigeration system having a liquid refrigerant line between a liquid receiver and an evaporator comprising means in the liquid refrigerant line for permitting the passage of light therethrough, a light source positioned adacent said means for directing a beam of light through said means and through the liquid refrigerant, a photo responsive device positioned adjacent said means and in general alignment with the beam of light after passage thereof through said means and the liquid refrigerant for detecting the light transmitted through said means and the liquid refrigerant, said device being responsive to a predetermined variations of the intensity of the beam of light passing through the liquid refrigerant and said means, the liquid refrigerant within said means decreasing the intensity of light passing therethrough when a leak occurs in the liquid refrigerant line thereby causing said device to respond to the leak in the refrigerant line.

2. The leak detection system as defined in claim 1 further comprising circuit means connected to said photo responsive device for indicating a leak in the refrigerant.

3. A leak detection system for detecting leaks of refrigerant in a refrigeration system having a liquid refrigerant line between a liquid receiver and an evaporator comprising a light transmitting housing in the liquid line having a passageway for the normal passage of liquid refrigerant therethrough, a light source positioned adjacent said housing for directing a beam of light laterally of said passageway and said housing and the liquid refrigerant therein, a photo responsive device positioned adjacent said housing and in general alignment with the beam of light after its passage through said housing for detecting the light transmitted through said housing, the liquid refrigerant within said housing decreasing the intensity of the beam of light transmitted therethrough a predetermined amount during leakage of the liquid refrigerant, said photo responsive device being responsive to said predetermined decrease in the intensity of the beam of light passed through the liquid refrigerant whereby the leakage is detected.

4. The leak detection system as defined in claim 3 further comprising circuit means connected to said photo responsive device for indicating the leakage of the refrigerant.

5. The leak detection system as defined in claim 3 further comprising circuit means connected to said photo responsive device for disabling further operation of the refrigeration system.

6. A leak detection system for detecting leaks of refrigerant in a refrigeration system having a liquid refrigerant line between a liquid receiver and an evaporator comprising a light transmitting housing in the liquid line having a passageway for the normal passage of liquid refrigerant therethrough, a light source positioned adjacent said housing for directing a beam of light laterally of said passageway and said housing and the liquid refrigerant therein, a photo responsive device positioned adjacent said housing and in general alignment with the beam of light after its passage through said housing for detecting the light transmitted through said housing, the liquid refrigerant within said housing decreasing the intensity of the beam of light transmitted therethrough a predetermined amount during leakage of the liquid refrigerant, said photo responsive device being responsive to said predetermined decrease in the intensity of the beam of light passed through the liquid refrigerant whereby the leakage is detected, a voltage source connected in circuit to said photo responsive device, a relay connected in circuit between said photo responsive device and light source, said relay normally being closed for connecting said voltage source to said light source prior to detection of the leakage of the refrigerant, said relay being open for decoupling said voltage source from said light source during detection of the leakage of the refrigerant.

7. A leak detection system for detecting leaks of refrigerant in a refrigeration system having a liquid refrigerant line between a liquid receiver and an evaporator comprising means in the liquid refrigerant line for permitting the passage of light therethrough, a light source positioned adjacent said means for directing a beam of light through said means and through the liquid refrigerant, a photo responsive device positioned adjacent said means and in general alignment with the beam of light after passage thereof through said means and the liquid refrigerant for detecting the light transmitted therethrough, said device being responsive to a predetermined decrease of the intensity of the beam of light passing through the liquid refrigerant and said means, the liquid refrigerant within said means decreasing the intensity of light passing therethrough when a leak occurs in the liquid refrigerant line, circuit means including a voltage source connected to said photo responsive device, a relay connected between said photo responsive device and said light source, said relay being closed for connecting said light source to said voltage source while said photo responsive device receives a sufficiently intense beam of light, said photo responsive device responding to said predetermined decrease of the intensity of the beam of light to de-activate said relay and extinguish said light source, a manual restart switch means connected in circuit between said relay and said photo responsive device for resetting said leak detection system after correction of the leaking refrigerant in the refrigeration system.

8. The leak detection system as defined in claim 7 wherein said circuit means further includes means connected in circuit with said relay for indicating the leakage of the refrigerant.

9. The leak detection system as defined in claim 8 wherein said means for indicating the leakage of the refrigerant includes means for disabling further operation of the refrigeration system.

References Cited

UNITED STATES PATENTS

| | | | |
|---|---|---|---|
| 2,432,859 | 12/1947 | Carter | 62—225 |
| 2,448,403 | 8/1948 | Turner | 62—204 |
| 3,168,218 | 2/1965 | Funk et al. | 250—218 X |

WALTER STOLWEIN, *Primary Examiner.*